United States Patent [19]
Kliphuis

[11] 3,749,999
[45] July 31, 1973

[54] POSITION SENSING TRANSDUCER INCLUDING AN ELECTRICAL WAVE PROPAGATING STRUCTURE OF VARYING ELECTRICAL LENGTH

[75] Inventor: Jans Kliphuis, Huntington, N.Y.

[73] Assignee: Comtech Laboratories Inc., Smithtown, N.Y.

[22] Filed: June 23, 1972

[21] Appl. No.: 265,633

[52] U.S. Cl. .................................. 318/369, 333/17
[51] Int. Cl. ........................................... G05b 1/06
[58] Field of Search......................... 318/669; 333/17

[56] References Cited
UNITED STATES PATENTS

| | | | |
|---|---|---|---|
| 3,122,665 | 2/1964 | Bailey | 318/669 X |
| 3,209,220 | 9/1965 | Joy | 318/669 |
| 3,448,358 | 6/1969 | Grudin et al. | 318/669 X |

Primary Examiner—T. E. Lynch
Attorney—Stephen B. Judlowe et al.

[57] ABSTRACT

A position sensing transducer employs a standing wave supporting electrical wave propagating structure, and probe apparatus coupled thereto, each affixed to different mechanical members adapted for relative translation therebetween. The wave propagating line is terminated other than by its iterative impedance, and feedback circuitry including a voltage controlled oscillator is employed to vary the electrical length of the wave line such that a node in the resulting standing wave pattern is developed at the probe position. The oscillator output frequency thus provides a direct measure of physical probe positiong vis-a-vis the wave line termination, and thereby also of the relative displacement of the two mechanical members.

In accordance with a further aspect of the present invention, the transducer may be included in a servomechanism arrangement to automatically position the mechanical members in a prescribed physical relationship along the controlled axis.

10 Claims, 2 Drawing Figures

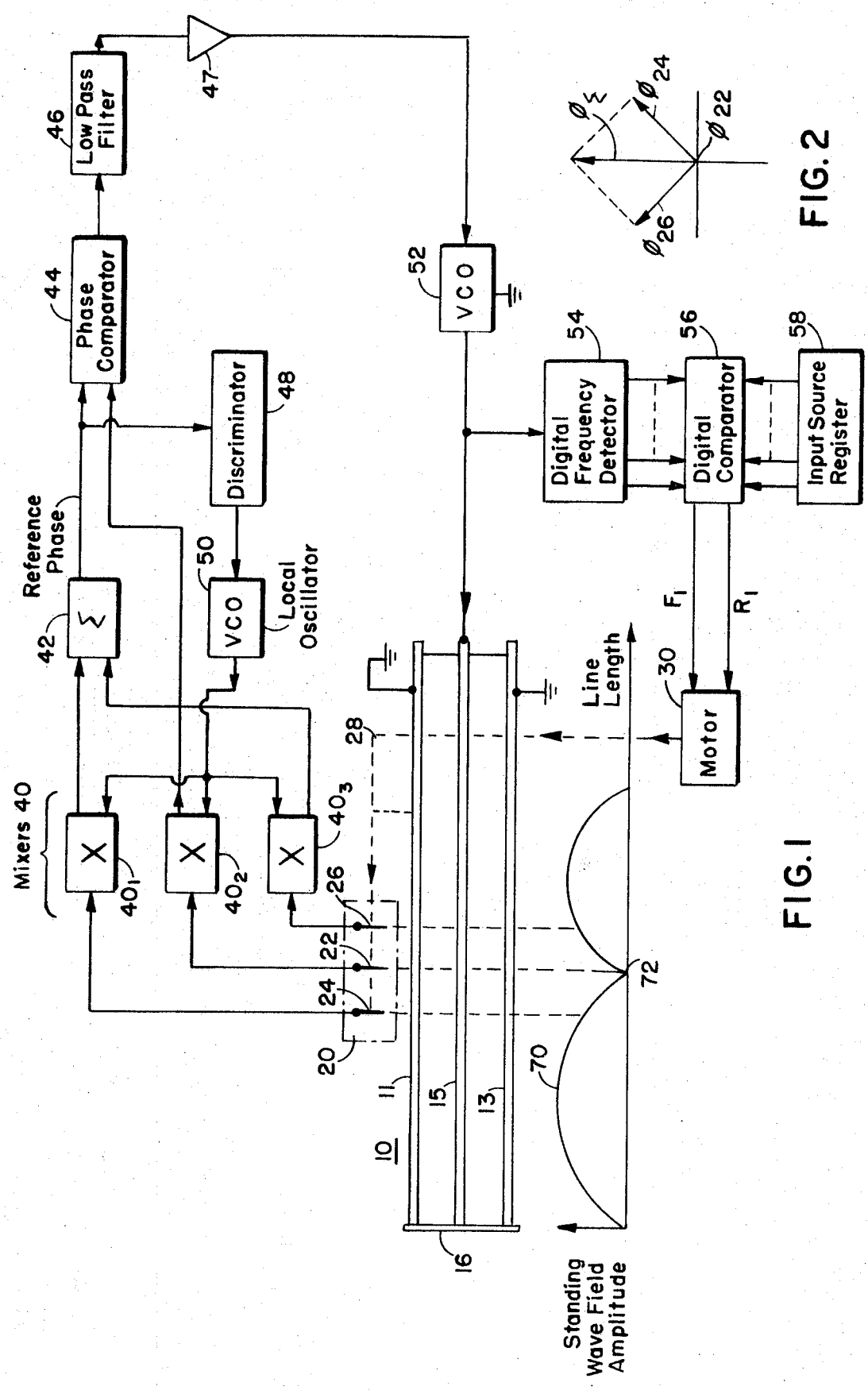

POSITION SENSING TRANSDUCER INCLUDING AN ELECTRICAL WAVE PROPAGATING STRUCTURE OF VARYING ELECTRICAL LENGTH

DISCLOSURE OF INVENTION

This invention relates to electronic instrumentation and control apparatus and, more specifically, to an improved position sensing transducer, and transducer controlled position implementing servomechanism organization.

In many applications of present day interest, it is necessary to determine the relative position of two mechanical members along one or more axes of a coordinate axis system. Thus, for example, it is important to accurately determine the relative positioning between a work piece and certain tool assemblies. Such tools may comprise a drilling, cutting, milling or other mechanical process element; an electrical printed circuit board component assembler or back plane wiring head; an integrated circuit wafer testing probe assembly; and X-Y plotter; or the like.

As below discussed, existing position reporting transducers are not entirely satisfactory. For example, for the machine tool context, relative positioning between a work supporting table and the tool is effected via a lead screw and follower nut, or equivalent mechanical apparatus, also having a position reporting scale mechanically coupled thereto. However, the lead screw or other actuator exhibits lost mechanical motion or backlash, i.e., a "dead zone" or lag between the inception of actuation (with a concomitant change in output position reading), and actual movement of the controlled member. This hysteresis limits the accuracy of the output position display, and comprises a major source of positional error and uncertainty.

It is an object of the present invention to provide improved position sensing transducer apparatus and circuitry.

More specifically, it is an object of the present invention to provide a position signaling transducer which obviates mechanical hysteresis errors; which provides output information in digital form; and which may be utilized in automated positioning apparatus.

The above and other objects of the present invention are realized in a specific illustrative position transducer for signaling the relative displacement of two mechanical members. The transducer comprises an open, standing wave supporting, electronic wave propagating structure (e.g., a slab or strip line, slotted coaxial cable or wave guide, or the like) terminated by other than its characteristic impedance. Accordingly, a variable frequency oscillator which drives the wave structure gives rise to a standing wave pattern therein.

Associated with the wave propagating line (which is mechanically fixed to, and translates with one mechanical member) is a probe assembly responsive to the standing electrical wave, and which is attached to the other mechanical member for translation therewith.

The probes are employed in conjunction with a phase comparator which compares the electric field phase at one probe location with a standard or reference wave phase. The voltage controlled oscillator responds to the comparator output potential by producing an output wave frequency to vary the electrical length of the wave propagating structure. More specifically, the oscillator output frequency is self adjusting such that a node in the standing wave pattern (and thereby also an electric field of reference phase) appears at the variable phase probe location.

The instantaneous oscillator frequency thus provides a direct measure of the relative probe-line termination distance. Digital position information may be derived by simply counting oscillator output pulses over a predetermined time interval.

In accordance with one aspect of the present invention, further digital feedback structure may be employed in conjunction with the transducer for automatic positioning purposes.

The above described features and advantages of the present invention will become more clear from the following detailed description of a specific illustrative embodiment thereof, presented hereinbelow in conjunction with the accompanying drawing, in which:

FIG. 1 schematically depicts transducer and automated positioning structure and circuitry embodying the principles of the present invention; and FIG. 2 is a phasor diagram characterizing operation for the arrangement of FIG. 1.

Referring now to FIG. 1, there is shown improved position sensing transducer apparatus which comprises an electrical wave propagating structure 10. The specific wave structure 10 shown in the drawing is a slab line comprising grounded outer conductor planes 11 and 13 and a center conducting plane 15 therefrom. It will be appreciated from the discussion hereinbelow that any other form of wave propagating structure 10 such as a strip line, slotted coaxial cable, slotted wave guide or the like may be employed as well. A probe assembly 20, for example, comprising three electrical field responsive probes 22, 24, and 26 mechanically fixed together, is adapted to move within the slab line 10. The line 10 is affixed to one of two mechanical members (not shown) adapted for a relative translation, and the probe assembly 20 is affixed to the other member such that the location of the probes 22-24-26 within the slab line is dependent upon the positional relationship obtaining between the two mechanical members being monitored.

The slab line 10 is terminated by an impedance differing from its iterative impedance, a short circuit termination 16 being shown in the drawing. Further, the line 10 is driven at its other extremity by a high frequency oscillation produced by a voltage controlled oscillator 52. As is well known, the non-characteristic impedance 16 will thus give rise to a standing wave pattern on the slab line 10, such standing wave pattern being developed as the linear sum of a main wave propagating down the line (to the left in FIG. 1), and at least one reversely directed wave reflected by the short circuit termination 16. A standing wave pattern 70 is graphically depicted in FIG. 1.

By way of general functional overview for the FIG. 1 transducer, it will be appreciated that the electrical length (i.e., length in wave lengths) of the slab line 10 between the location of the center probe 22 and the termination 16 will vary as a function of the output sinusoidal frequency supplied by the voltage controlled oscillator 52, the line becoming electrically longer (more wavelengths) as frequency increases. As the basic measuring principle for the FIG. 1 apparatus, the location of the probe assembly 20 within the line 10 is determined by the relative location of the mechanical members to which the probe and line are attached.

Feedback circuitry is then employed to automatically adjust the output frequency of the voltage controlled oscillator 52 such that a node in the standing wave pattern is developed at the position of the probe 22, as shown for the curve 70 point 72 in the drawing. The output frequency of the sinusoid supplied by the voltage controlled oscillator 52 thus provides a direct measure of the physical distance between the probe 22 and the termination 16 and, more generally, embodies information characterizing the relative positions of the two members to which the transducer parts 10 and 20 are attached.

To this end, the circuitry of FIG. 1 produces a first or reference wave, i.e., an electrical signal having a phase which would obtain at the location of the probe 22 if the line 10 were in fact terminated by its iterative impedance. The phase of this reference wave is then compared with the phase of the electrical signal in fact detected by the probe 22. The phase of the two signals will be the same if, and only if, a node in the standing wave pattern is disposed at the probe 22 location. If the frequency supplied by the oscillator 52 either exceeds or is less than the value required to so position the standing wave node, the phase of the wave sensed by the probe 22 will either markedly lead or lag the reference phase (as is well known, the electric field phase will change between 90° phase lead and 90° phase lag vis-a-vis the magnetic field phase about the node point for an ideal open or short circuit terminated line). Accordingly, a phase comparator is employed to compare the voltage phase induced in the probe 22 with the reference phase to suitably adjust the control potential supplied to the voltage controlled oscillator 52 such that the standing wave node is properly disposed to coincide with the probe 22 by feedback action. The output frequency of the voltage controlled oscillator 52 thus provides information characterizing the position of the probe 22, i.e., that frequency required to make the distance between the probe 22 and the termination 16 an even integral multiple of quarter wave lengths of the incident wave (for the short circuit termination case).

Returning again to the specific circuitry of FIG. 1, the voltages sensed by the probes 24 and 26 disposed on either side of, and equidistant from the center probe, are coupled via mixers $40_1$ and $40_3$ to a summing network 42. In accordance with one aspect of the present invention, the absolute frequency (but not the phase) of the voltages sensed by the probes 24 and 26 (and the probe 22) is shifted by the mixers 40, operating in conjunction with the output of a variable frequency common local oscillator 50, such that the signals processed by a phase comparator 44 in the FIG. 1 arrangement are always of a like frequency. Thus, the comparator 44 need be aligned only at a single frequency, and need not exhibit uniformity of response over a wide operative frequency range. A discriminator 48, the common voltage controlled local oscillator 50, and the mixers 40 operate in a manner well known per se as an automatic frequency control circuit to maintain the outputs of the mixers 40, and thereby also the inputs to the phase comparator 44 substantially constant in frequency.

The voltages impressed in the probes 24 and 26 are linearly summed in an adder network 42. These voltages are shown in phasor diagram form in FIG. 2, with the voltages associated with probes 24 and 26 being indicated by the designations $\theta_{24}$ and $\theta_{26}$. It will be observed that the sum of these two potentials, present at the output of the summing network 42 and shown by the designations $\theta_\Sigma$ in FIG. 2, is intermediate in phase between the voltages sensed by the probes 24 and 26. This signal $\theta_\Sigma$ exhibits precisely the phase that would obtain at the position of the probe 22 if the slab line 10 were terminated in its characteristic impedance, i.e., were free of any standing waves.

The above discussion has implicitly assumed that any transients have abated in the composite feedback arrangement, and is adjusted to position node point 72 at the probe 22 location. This results in the equal valued, and opposite sense phase displacements for the vectors $\theta_{24}$ and $\theta_{26}$.

The reference phase signal at the output of the summing network 42 is supplied as one input to the phase comparator 44. The voltage induced in the probe 22, after a shift in frequency in a mixer $40_2$, is supplied as a second input to the comparator 44. The phase of the signal detected by the probe 22 when the feedback system is stabilized at steady state, is shown by the vector $\theta_{22}$ and is in phase with the reference potential. The amplitude of the potential at node point 72 is essentially dependent upon the losses in the line 10 for two wave traversals of the line between the probe 22 location and the short circuit termination 16. The amplitude may be increased by providing some additional resistance at the termination.

Responsive to the like phased input signals $\theta_\Sigma$ and $\theta_{22}$, the output of the phase comparator 44, cooperating with a following low pass filter 46 and amplifier 47, maintains the output frequency of the voltage controlled oscillator 52 at its then present output frequency to retain the node 72 of the standing wave pattern at the physical location of the probe 22. The output frequency of the voltage controlled oscillator 52 provides a direct measure of the distance between the line termination 16 and the probe 22 (and thereby also between the two mechanical members to which these elements are secured). This position information may be converted to conventional parallel digital form by a digital frequency detector 54 connected to the output of the oscillator 52. Many forms of digital frequency detectors 54 are well known to those skilled in the art, e.g., a counter which is cleared at the beginning of a fixed interval, and which supplies its output count at the end of the timed interval to an information preserving latch or register.

Moreover, as long as the positioning of the probe assembly 20 within the line 10 does not change, the FIG. 1 circuitry operates to maintain the output frequency of the voltage controlled oscillator 52 constant by servomechanism action. Thus, for example, if the frequency output of the voltage controlled oscillator attempts to decrease below its required value, the node point 72 tends to shift to the right slightly in FIG. 2 thus slightly displacing the phase of the reference potential output of the adder 42. However, for this assumed condition, the phase of the voltage sensed by the probe 22 shifts markedly from the reference (resistive-resonant) condition to markedly lead the phase of the output potential from adder 42. This condition is noted by the phase comparator 44 which acts through the low pass filter 46 of the amplifier 47 to change the control potential of the voltage controlled oscillator 52 in a direction to correct (here: increase) its output frequency, i.e., to reposition the standing wave node 72 at the station of the probe 22. Comparable circuit function obviates any tendency of the oscillator to drift in an increasing frequency direction.

Assume now that the mechanical members to which the line 10 and probe assembly 20 move with respect to one another, thereby changing the distance between the line termination 16 and the probe 22. As such movement is experienced, the node point 72 is displaced from the position of the probe 22. In the manner described in the immediately proceeding paragraph, the feedback circuitry of FIG. 1 automatically operates to supply a corrective potential to the voltage controlled oscillator 52 to vary the frequency of the wave supplied to the slab line 10 such that the node point 72 in the standing wave pattern tracks the instantaneous location of the probe 22 within the response capacity of the feedback loop. As above noted, the instantaneous output frequency of the voltage controlled oscillator 52 thus at all times identifies the relative positions of the monitored mechanical elements within the band width response limitations of the feedback loop.

The above discussion has considered the manner in which the FIG. 1 transducer provides information which instantaneously characterizes the relative location of the probe assembly 20 vis-a-vis the slab line 10, and thereby also the relative location of surfaces to which the two structures 10 and 20 are affixed. This information is available in analog form as the control input potential to the voltage controlled oscillator 52; is available in pulse rate form at the output of the voltage controlled oscillator 52; and is available in parallel digital form at the output of the frequency detector 54.

It will be appreciated that the transducer of FIG. 1 may be employed in a further feedback loop to implement automatic positioning of the two surfaces attached to the transducer structures 10 and 20. To this end, a register 58 is loaded with parallel binary information descriptive of a desired position for the controlled mechanical elements. The register 58 may be of any conventional construction, and may be loaded by a cemputer, paper or magnetic tape, an information store, or the like. The register 58 thus contains information identifying the desired position for the controlled surfaces (and thereby also the line 10 and probe assembly 20) while the frequency detector 54 reports the actual, current position of the surfaces. The two digital numbers presented by the elements 54 and 58 are compared in a digital comparator 56.

A motor 30 is coupled via any suitable linkage 28, e.g., gearing, a lead screw drive or the like for changing the relative displacement of the controlled surfaces along the axis monitored by the transducer. A first output of the comparator 56 actuates the motor 30 to move the surfaces in a first (e.g., forward) direction responsive to one inequality between the digital outputs of the registers 54 and 58, and signals the motor 30 to move the controlled surfaces in an opposite direction when an opposite inequality relationship obtains. When the contents of the detectors 54 and register 58 are the same, indicating that the motor has properly positioned the controlled surfaces in accordance with the contents of the register 58, the motor 30 is not activated, and the positioned relationship is maintained until a new number (position) is loaded into the register 58 to signal that a repositioning of the surfaces is required.

The arrangement depicted in FIG. 1 has thus been shown by the above to comprise an improved position sensing transducer, and position implementing servomechanism organization. The apparatus is responsive to movement in a prescribed direction determined by the degree of freedom of the probe assembly 20 to move within the slab line 10. It will be readily appreciated that plural such transducers may be oriented in diverse directions to control positioning of corresponding mechanical elements along such plural axes.

The above described arrangement is merely illustrative of the principles of the present invention. Numerous modifications and adaptations thereof will be readily apparent to those skilled in the art without departing from the spirit and scope of the present invention. For example, the mixers 40, discriminator 48 and variable frequency local oscillator 50 may be deleted, and the voltage signals induced in the probes 24 and 26 directly supplied to the summing network and comparator 42 and 44. However, for such an organization, the phase comparator 44 must be operative for the spectrum of frequencies supplied by the voltage controlled oscillator 52 to the wave propagating structure 10.

Then also, other arrangements will be obvious to those skilled in the art for developing the reference phase input signal to the phase comparator 44. Thus, for example, such a potential may be developed by employing a second wave line terminated with its characteristic impedance, and having coupled thereto a probe mechanically ganged to move with the probe 22 of FIG. 1. The second slab line is energized by the voltage controlled oscillator 52 in parallel with the line 10.

Other arrangements will be apparent as well for signaling when the probe 22 is at a node in the standing wave pattern on the line, i.e., at a resistive (resonant) impedance point at the transition of capacitive and inductive reactive points on line, at a node of the current or voltage standing wave pattern.

What is claimed is:

1. In combination in a position sensing transducer, an electrical wave propagating structure having a characteristic impedance, means terminating said wave propagating structure in other than its said characteristic impedance, probe means coupled to said electric wave propagating structure and adapted for relative movement with respect thereto, a voltage controlled oscillator for supplying an electric wave varying frequency to said wave propagating structure, said voltage controlled oscillator thereby impressing a standing wave of variable wavelength on said wave propagating structure, varying the electrical length of said wave propagating structure, and feedback means connected to said probe means and to said voltage controlled oscillator for adjusting the frequency of said oscillator for positioning a node of said standing wave pattern at the location of said probe means.

2. A combination as in claim 1 further comprising servomechanism means for automatically positioning said probe means with respect to said wave propagating structure, said servomechanism means comprising source means for supplying information descriptive of a desired positioned relationship of said probe means vis-a-vis said wave propagating structure, comparator means for comparing the instantaneous position of said probe means with respect to said wave propagating structure and the information supplied by said source means, and actuator means responsive to the output of said comparator means for selectively moving said probe means with respect to said wave propagating structure.

3. A combination as in claim 2 further comprising first mechanical apparatus fixed to said probe means, and second mechanical apparatus mechanically fixed to said wave propagating structure.

4. A combination as in claim 1 further comprising first mechanical apparatus fixed to said probe means, and second mechanical apparatus mechanically fixed to said wave propagating structure.

5. A combination as in claim 2 further comprising a digital frequency detector connected to the output of said voltage controlled oscillator, and wherein said source means comprises a digital register and said comparator comprises a digital comparator.

6. A combination as in claim 1 wherein said feedback means further comprises a phase comparator.

7. A combination as in claim 6 wherein said feedback means further comprises a low pass filter and amplifier.

8. A combination as in claim 1 wherein said transducer means comprises means for generating a signal of reference phase, corresponding to that obtaining at a node of said standing wave pattern, and phase comparator means having inputs thereof connected to the potential induced in said probe means and the potential supplied by said reference phase signal generating means.

9. A combination as in claim 8 wherein said reference node phase signal generating means comprises additional probe means laterally disposed with respect to said probe means and fixed for motion therewith, and adder means for summing the potentials induced in said probe means and said additional probe means.

10. A combination as in claim 8 further comprising heterodyning and automatic frequency control means for maintaining the input frequencies supplied to said phase comparator constant.

* * * * *